Sept. 8, 1925.
L. GENDLER
1,552,430
RING ROLL FORMING MACHINE
Filed Oct. 24, 1924
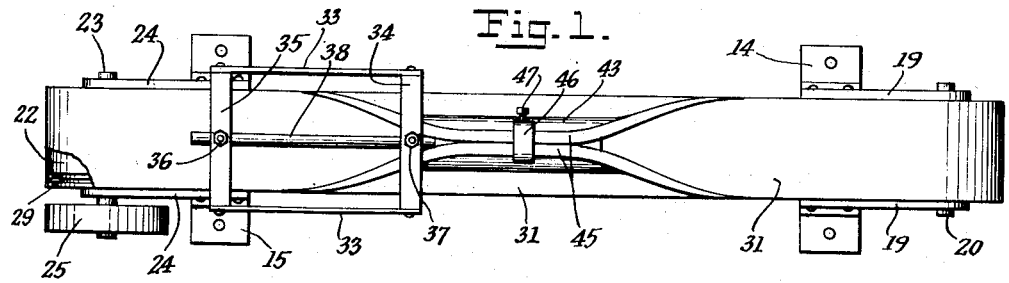
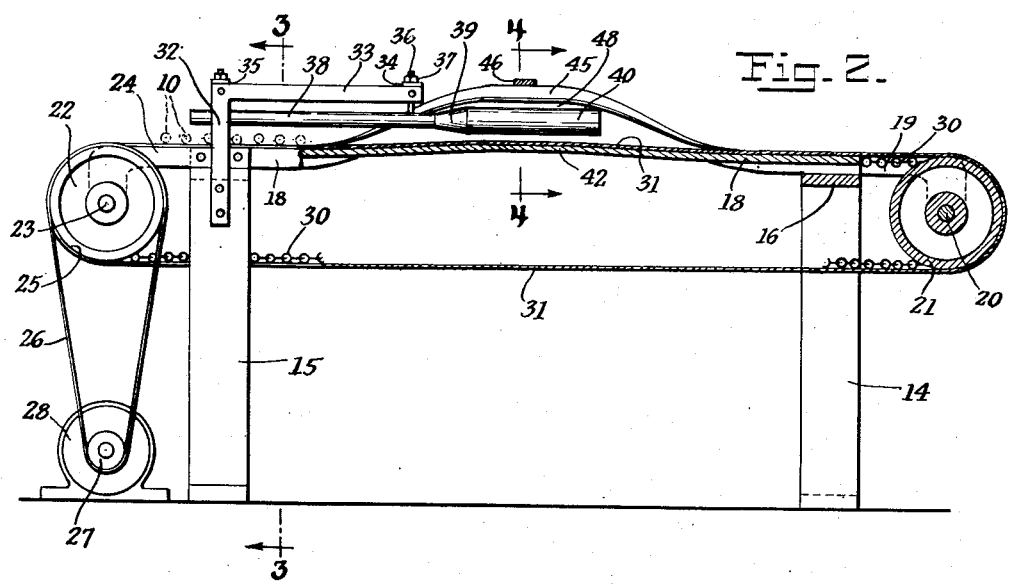
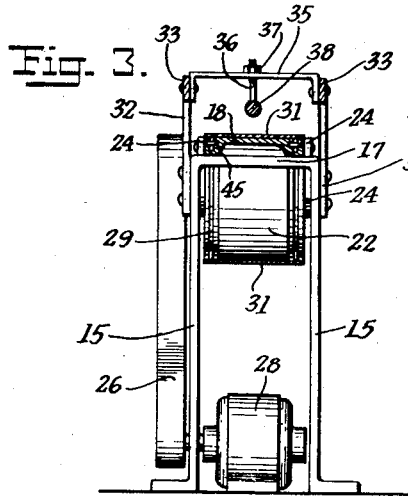
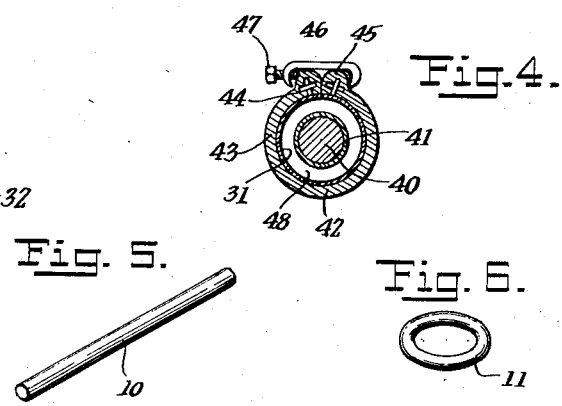
INVENTOR.
Louis Gendler
BY
ATTORNEY Patented Sept. 8, 1925.

1,552,430

UNITED STATES PATENT OFFICE.

LOUIS GENDLER, OF BRONX, NEW YORK.

RING-ROLL-FORMING MACHINE.

Application filed October 24, 1924. Serial No. 745,572.

*To all whom it may concern:*

Be it known that I, LOUIS GENDLER, a citizen of the United States, and resident of Bronx, New York, in the county of Bronx and State of New York, have invented certain new and useful Improvements in Ring-Roll-Forming Machines, of which the following is a specification.

This invention relates to bakers' and confectioners' machinery and has as one of its objects to provide a mechanism for coiling a round roll of semi-plastic material, such as bakers' dough, into a circular form, joining the ends and completely forming the same into a ring or endless mass of uniform cylindrical cross section.

Another purpose is to produce a machine which is entirely automatic in its action, requiring no manual labor or contact of the hands with the dough except in supplying the machine with raw material and removing the finished product.

A further aim is in the provision of a simple compact machine, occupying a limited floor space, easily operated and productive of finished rings of dough in a rapid and positive manner.

These several objects are accomplished by the novel construction, combination and arrangement of parts hereinafter described and shown in the accompanying drawing, forming a material part of this disclosure, and in which:—

Figure 1 is a plan view of an embodiment of the invention.

Figure 2 is a side elevational view thereof, parts being shown in section to disclose the construction.

Figure 3 is a transverse sectional view taken on line 3—3 of Fig. 2.

Figure 4 is a similar view taken on line 4—4 of Fig. 2 drawn to an enlarged scale.

Figure 5 is a perspective view of a roll of the raw material to be formed into a ring.

Figure 6 is a similar view of the ring as completed.

In the making of ring rolls, crullers and the like, the dough batch is prepared in the proper consistency from the usual ingredients, including suitable leavening material if desired, and in the present case, shaped by extrusion through a funnel or by rolling on a smooth level surface, into an essentially straight, relatively solid round roll, having squarely cut ends, as shown in Fig. 5, these roll blanks 10 being substantially uniform in diameter and of equal length, which must be such as to exactly constitute the finished product 11, as shown in Fig. 6, preparatory to baking.

The simple machine to form the rolls 10 into the rings 11, consists of pairs of opposed uprights 14 and 15, respectively at the front and rear, having flanges which may be bolted to the floor and connected at their upper ends by cross bars 16 and 17.

Fixed on the upper surfaces of the cross bars 16 and 17, to extend therebetween, is a platen 18 constituting the frame or bed of the machine.

Extending to the front from the uprights 14 are a pair of plate brackets 19 having down-turned ends in which is a spindle 20 carrying a broad faced wheel 21, and a similar wheel 22 is mounted on a spindle 23 held in like brackets 24 fixed on the rear uprights, 15.

One end of the spindle 23 projects outwardly beyond the bracket and carries a drive pulley 25 over which is trained a belt 26 driven by a pulley 27 on the shaft of a motor 28.

Both wheels 21 and 22 contain annular grooves 29, adapted to receive the links of a pair of endless chains 30 trained over the wheels and having attached to them an endless fabric belt conveyor 31 making contact with the peripheries of the wheels 21 and 22.

Fixed on the uprights 15 are vertical strips 32 having forwardly extending arms 33 and rigidly carried by the arms are spaced brackets 34 and 35, the latter being in register with the strips 32.

Screw threaded studs 36 pass through the centers of each bracket 34 and 35, these studs being provided with clamp nuts 37 to hold them in adjustment, and fixed to the downwardly extending ends of the studs is a round bar 38 having at its front end a conical portion 39 blending into an enlarged cylindrical head or mandrel 40 extending to the front, past the center of the machine, and which may be provided with a textile sheath or casing 41 as best shown in Fig. 4, this sheath, like the conveyor belt 31, acting to prevent adherence of the soft dough to the surface of the metal.

The platen 18 is raised slightly at the center, as at 42, and its two sides are curved to produce a cylinder 43 at the center of the apparatus, the ends of the cylinder gradually blending with the flat portions of the platen ends as shown.

The edges of the platen are grooved longitudinally to receive the links of the chain, as at 44, these edges being thickened, as at 45, and when in contact, as shown in Fig. 4, a clamp 46 is provided, the clamp having a set screw 47 so that the tubular shape may be rigidly maintained.

It is to be understood that the chains 30 and also the conveyor 31 attached to the chains, are compelled to conform to the platen including the interior of the tube, as they are advanced, and at the center an annular space 48 is presented, into the axis of which the fixed but adjustable head 40 extends, acting as a mandrel in the formation of the product.

It will now be seen that when the motor is energized, the chains and attached conveyor will be moved circuitously over the wheels 21 and 22 and caused to conform to the profile of the tubular central portion of the apparatus as the machine is operated.

The straight and uniform rolls of dough 10 are disposed by hand on the conveyor, at the rear of the machine and as the ends of the rolled dough make contact with the convergingly curved elements of the tubular former 42—43, they are caused to curve upwards towards each other being guided by the cone 39 and mandrel 40 and forced into rings by the walls 43, thereafter issuing in the shape of endless rings, disposed flat on the surface of the conveyor to be discharged when passing over the wheel 21, ready for baking.

It will be understood that the operation of the machine is continuous, requiring only to be fed with the dough rolls which must be so proportioned as to fill the space between the cover of the mandrel and interior of the conveyor when curved to present a tube, while the length of the roll must be such that the two ends will make intimate contact and not separate after the rings have been formed.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:—

1. A dough ring former comprising a frame, wheels revoluble at the ends thereof, an endless flexible conveyor trained over said wheels, means for driving said conveyor continuously, means fixed on the frame to cause said conveyor to gradually assume a cylindrical cross sectional form and thereafter expand symmetrically to become flat, and a mandrel supported centrally above said conveyor at the rear thereof, said mandrel having an enlarged cylindrical forward portion extending axially into the cylindrically shaped portion of said conveyor as it is advanced to produce an endless dough ring of circular cross section.

2. A dough ring former comprising a frame, wheels revoluble at the ends thereof, an endless flexible conveyor trained over said wheels, means fixed on the frame to cause said conveyor to gradually assume a cylindrical cross sectional form and thereafter become level, a mandrel supported axially of said cylindrical portion, an enveloping sheath for said mandrel and means for adjusting the mandrel within the cylindrical portion.

3. A dough ring former comprising a frame, grooved wheels revolubly mounted at the ends of the frame, means for driving one of said wheels, chains trained over said wheels to travel in the grooves therein, a flexible conveyor belt secured to said chains, said belt being in contact with the peripheries of the wheels, a platen fixed on said frame over which the conveyor operates, said platen having its central portion curved to present a cylinder in cross section, and an adjustable mandrel supported axially of the cylinder, said conveyor being adapted to carry rolls of dough through the central portion whereby they are formed into rings.

4. A dough ring former comprising a frame, grooved wheels revolubly mounted at the ends of the frame, means for driving one of said wheels, chains trained over said wheels to travel in the grooves therein, a flexible conveyor belt being in contact with the peripheries of the wheels, a platen fixed on said frame over which the conveyor operates, said plate having its central portion curved to present a cylinder in cross section, and containing longitudinal grooves near its edges to receive said chains, a mandrel extending axially into the curved portion of said platen, and a textile covering over said mandrel.

Signed at New York, in the county of New York and State of New York, this 10th day of October, 1924.

LOUIS GENDLER.